(12) United States Patent
Howarth

(10) Patent No.: US 6,669,007 B2
(45) Date of Patent: Dec. 30, 2003

(54) SUSPENSION RAIL

(75) Inventor: Arthur Dennis Howarth, Hunmanby (GB)

(73) Assignee: Hangerglide Ltd., Wakefield (GB)

( * ) Notice: Subject to any disclaimer, the term of this patent is extended or adjusted under 35 U.S.C. 154(b) by 184 days.

(21) Appl. No.: 10/032,851

(22) Filed: Oct. 24, 2001

(65) Prior Publication Data

US 2002/0088369 A1 Jul. 11, 2002

(30) Foreign Application Priority Data

Oct. 27, 2000 (GB) .............................................. 0026307

(51) Int. Cl.[7] .............................................. B65G 17/20
(52) U.S. Cl. .................................. 198/678.1; 198/465.4
(58) Field of Search ............................ 198/678.1, 465.4

(56) References Cited

U.S. PATENT DOCUMENTS

| | | | | |
|---|---|---|---|---|
| 3,734,027 A | * | 5/1973 | Brummett et al. ........ | 104/172 S |
| 3,845,855 A | * | 11/1974 | Schwarz et al. ............ | 198/213 |
| 4,977,996 A | * | 12/1990 | Duce ...................... | 198/349.95 |
| 5,005,691 A | * | 4/1991 | Jennewein et al. ....... | 198/465.4 |
| 5,050,833 A | * | 9/1991 | Usner ........................ | 248/340 |
| 5,103,737 A | * | 4/1992 | Iwase ......................... | 104/88 |
| 5,301,809 A | * | 4/1994 | Skinner ..................... | 209/3.1 |
| 5,377,814 A | * | 1/1995 | Smith et al. .............. | 198/465.4 |
| 5,404,989 A | * | 4/1995 | Veen et al. ................ | 198/365 |
| 5,657,851 A | * | 8/1997 | Speckhart et al. ....... | 198/465.4 |
| 5,660,261 A | * | 8/1997 | Speckhart et al. .......... | 198/357 |
| 6,446,787 B2 | * | 9/2002 | Jacobson et al. ........ | 198/465.4 |
| 6,460,685 B1 | * | 10/2002 | Johansson et al. ....... | 198/465.4 |

* cited by examiner

Primary Examiner—Joseph E. Valenza
Assistant Examiner—Rashmi Sharma
(74) Attorney, Agent, or Firm—Higgs, Fletcher & Mack LLP; Charles F. Reidelbach, Jr.

(57) ABSTRACT

A suspension rail comprises a rail body (18) having a slide track (22,24) extending lengthwise of the rail, the slide track (22,24) being adapted to slidably support hangers thereon. The general novelty is that the slide track comprises two parallel tracks (22,24) of low friction plastics held in or by the rail body (18) and spaced by the rail body (18), so that a hanger (38) suspended on the rail contacts the rail only at the two tracks (22,24).

Particular features are that the body (18) is a one piece extrusion of aluminium, and there are two rods (22,24) which form the tracks, these rods (22,24) being in grooves (18A,18B) in the body (18). The rods are firmly fixed by crimping part of the body (18) after the rods have been inserted in the grooves (18A,18B). Rods (22,24) of right angled triangular cross section are preferred as they can be inserted and clamped easier and held more securely than circular rods, and made to project further from the body than circular rods.

The invention also provides an advantageous means (110) of providing jumpers for accommodating rod expansion joints and rail system switches.

16 Claims, 10 Drawing Sheets

SUSPENSION RAIL

This invention relates to a suspension rail for the carrying of hangers, especially, although not exclusively, garment hangers.

In garment manufacturing factories, in garment marshalling sheds, and garment carrying vehicles, and some other locations, rail systems are used for the suspension and conveying of garments and garment parts in large numbers. These systems use suspension rails which may be used in conjunction with drive arrangements so that the garments can be power driven from location to location. Additionally or alternatively, the systems may have rails from which the garments are suspended on their hangers for movement by manual force.

In any event, the garments are suspended by their hangers in such a manner as to friction engage the rail in that the hook of the hanger drapes over the rail and depending upon the weight of the hanger and its supported garment, so the hanger will engage the rail with a certain force. To move the hanger and its garment along the rail, a certain effort is needed to overcome the friction between the rail and the hanger, and when it is noted that as many as 1000 hangers and their garments may have to be moved at any one time, considerable effort is needed to move the garments, and accordingly it is desired that the coefficient of friction, static and dynamic, between the hangers and rail, should be as small as possible.

Heretofore, not much attention has been paid to the construction of the rail, as regards minimising friction, as it is most common for the systems to be power driven, and the rail simply has been made as robustly and cheaply as possible. Consequently, the rails of existing rail systems have tended to be of steel, with the hanger loop running directly on a track of steel. To keep the system running efficiently, the steel rails have to be lubricated from time to time, and the tracks are prone to rusting.

Secondarily, when it has to be scrapped, the steel rail does not have a good residual value.

The present invention seeks to provide a suspension rail exhibiting good friction characteristics, and which, in the preferred from makes use of aluminium in place of steel, giving the rail a better residual value than steel. It is also to be mentioned that some steel constructions may be used, and indeed steel and aluminium combinations can also be used.

According to the invention there is provided a suspension rail comprising a rail body having slide track means extending lengthwise of the rail, said slide track means being adapted to slidably support hangers thereon, wherein the slide track means comprises two parallel tracks of low friction plastics held in or by the rail body and spaced by the rail body, so that a hanger suspended on the rail contacts the rail only at the two tracks.

The use of low friction plastics rod means that lubrication will not be required, overcoming the disadvantage of the known steel rails. However, it is desired that the plastics material should be of high wear resistance, so that replacement is not required too frequently, if at all.

It has been found that the plastic material sold by Du Pont under the name Delrin (registered trade mark) is particularly suitable in that it has the following characteristics

| Dynamic coefficient of friction | | |
|---|---|---|
| Delrin against steel | 0.27 | (see note) |
| Delrin against Delrin | 0.38 | |

Note. The tested steel was 100 Cr6 steel, hardness HRB:93 surface roughness Ra 0.10 micron.

The tests were conducted at speed 0.5 m/s and at a load of 10N

| Specific Wear Tests | |
|---|---|
| Delrin against steel | 12 × 10−6 nm3/Nm |
| Delrin against Delrin | 11.50 × 10−6 nm3/Nm |

The steel type was as above. Speed 0.084 m/s; pressure 0.624 MPs

The reason for testing Delrin against steel and against itself is that the hangers typically will be of steel or plastics material.

The above figures illustrate a material which is excellent for this invention, but it is to be mentioned that the invention is not to be considered as limited to this material.

It is preferred that the two tracks be separate, discrete rods in that by virtue of using two discrete tracks, these tracks can be of a small size and of simple cross section, including circular or approximating to circular, but other shapes, such as triangular, as referred to herein are particularly effective in having particular advantage. Indeed, tracks of or approximating triangular shape are particularly preferred, in that a corner of a triangular shape can project beyond the rail body further than say circular tracks, and the wide base part can be effectively locked in grooves in the rail body.

The provision of two separate and small sized rods is of importance in that it has been found that the above plastic which I have been able to identify as being particularly suitable for the purpose is very expensive, and part of this invention is to achieve low friction/low wear suspension, but to keep the cost of the rail to a competitive level.

Typically, although not limiting, the rods of plastic will be of the order of 5/6 mm in diameter or maximum dimension.

In a preferred arrangement, the rods are initially held in grooves in the body in a somewhat loose fashion and then the rods are anchored in the grooves by deforming (e.g. crimping) the material forming the sides of the grooves onto the tracks. The rail body may be specially configured to enable this to be done. The configuring may be done by design of the extrusion shape, when the body, as is preferred, is a one-piece extrusion.

In a preferred arrangement, the rail body is entirely or mostly of aluminium extrusion or steel, and it may be in one or more parts.

The use of aluminium provides the advantage mentioned above that the residual value of the rail is greater than steel in that aluminium can be more readily re-processed.

The rods may be placed in grooves by being sprung or slid into the grooves, or in another arrangement, where the deforming is not needed, they may held by so designing the rail body that the rods can be placed in the body and then are clamped in position.

In such other arrangement, the rods may be held in position after mounting of a part of the rail in its in use position in the factory or other location, followed by fitting of the rods, which may be in long lengths or short lengths, followed by fitting a clamping part or parts of the rail which clamp the rods in position. Secure holding of the rods is important, as they will not always be arranged in straight configuration, in that these suspension rails are often required to curve in horizontal and vertical planes. When the rails are curved, there is a tendency for circular tracks to spring out of the grooves.

The rails used in any one factory or storage or marshalling shed, may run to many hundreds of meters, and so although long lengths of rod may be used, there will inevitably be joints or junctions (for example at switch points as explained herein) in the rods of the respective tracks. Where there are joints, in one arrangement, the joints of one of the tracks are staggered longitudinally of the joints in the other track.

According to a preferred form of the invention however, the suspension rail comprises a joint or junction, preferably enabling the plastic rods to expand with temperature increase, and at such joint or junction, the ends of rod sections are covered by a jumper rail section which overlies rod ends, providing a ramp over which the hangers travel as they are moved along the rail and over the joint or junction.

Preferably, when the jumper rail section is at a joint, the aligned ends of the rod sections in the respective grooves are spaced to allow for thermal expansion, and the jumper rail section has tongues which are engaged in the body grooves between the aligned ends of the rod sections, which are spaced sufficient to accommodate the expansion and the tongues.

At junctions, for example at switch locations, rail sections may be coupled by connecting blocks, and each connecting block may have an integral ramp for the purposes aforesaid.

At a switch section, a switch length of rail may be pivoted to a first main length of rail, so as to be selectively aligned, manually or automatically, with either of at least two further main lengths of rail, whereby the hangers can travel from the first length of rail to the second or third length of rail and vice versa.

Although in the preferred embodiment, the body is a one piece aluminium extrusion, in another embodiment the rail comprises an extruded section defining spaced parallel seats for the rods of the respective tracks, the section also having a bridge portion extending between the seats, said bridge portion being adapted to receive, preferably by push fitting, plastic clamping sections or plugs which have clamping edges which engage and clamp the rods when the clamping sections or plugs are fitted to the section defining the seats, after the rods are located on said seats.

Many configurations of rail for holding the rods are possible.

Embodiments of the invention will now be described, by way of example, with reference to the accompanying diagrammatic drawings, wherein.

Figure 1:
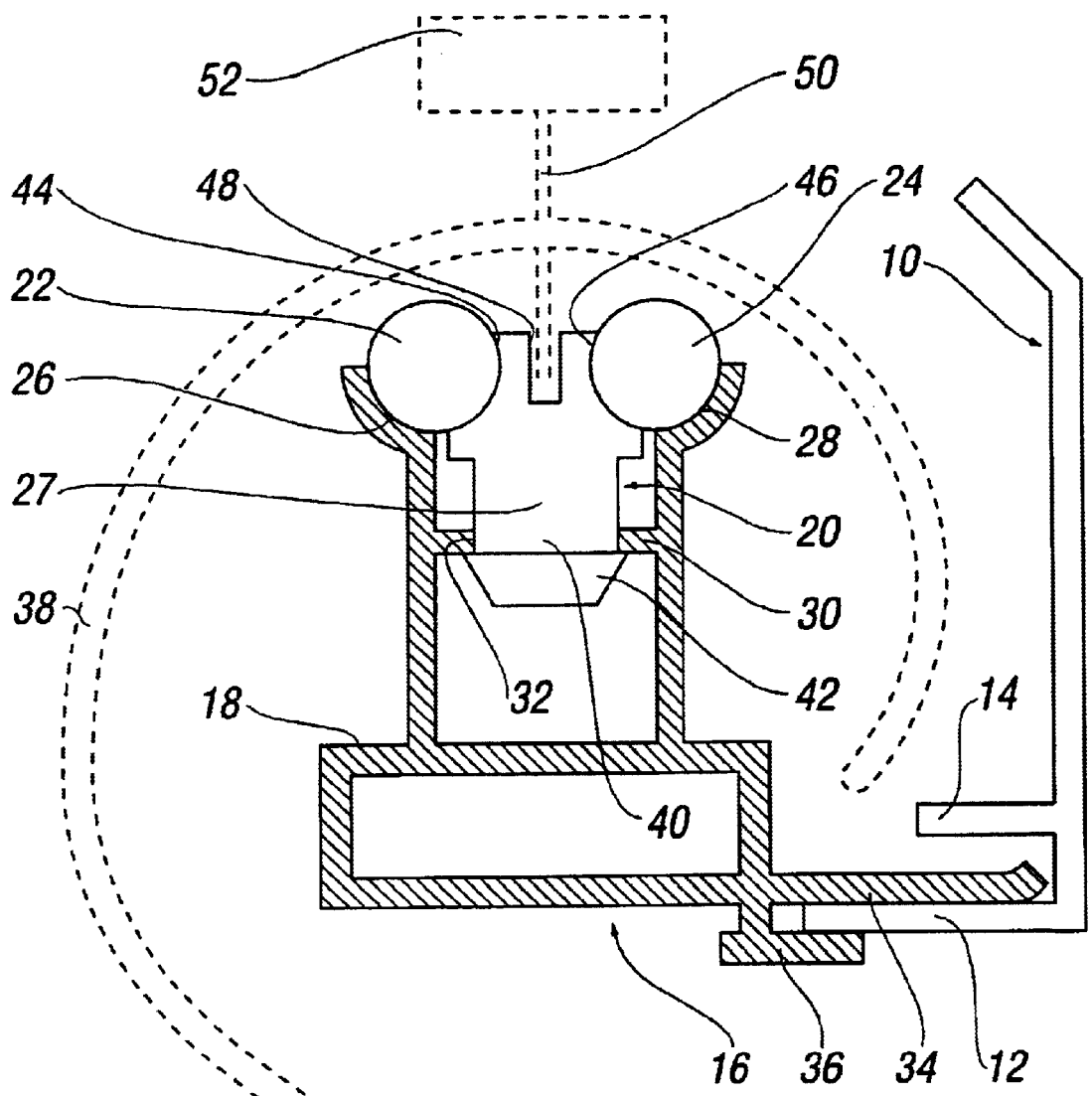
FIG. 1 is a sectional view of part of a suspension rail installation, including a rail according to one embodiment of the invention.

Referring to the drawings, and firstly to FIG. 1, the assembly shown therein comprises an extruded aluminium mounting plate 10 which in use would be attached to support scaffolding fixed to the factory floor/walls/ceiling. The support plate is of long length and is shown in cross section in FIG. 1. It has a support plate portion 12 and a catch ledge 14.

Portion 12 and ledge 14 serve to receive and support in a removable manner the system suspension rail 16 which in this example is made up of an aluminium extruded section 18, and clamping means 20 which together make up the rail body and which together clamp to the body in parallel array, two identical, discrete track rods 22 and 24, which are of low friction, low wear plastics material, for example of the type mentioned herein. The clamping means may be extruded plastic bars or a series of injection moulded plastic plugs 27, which snap into the section 18 as described hereinafter.

Figure 2:
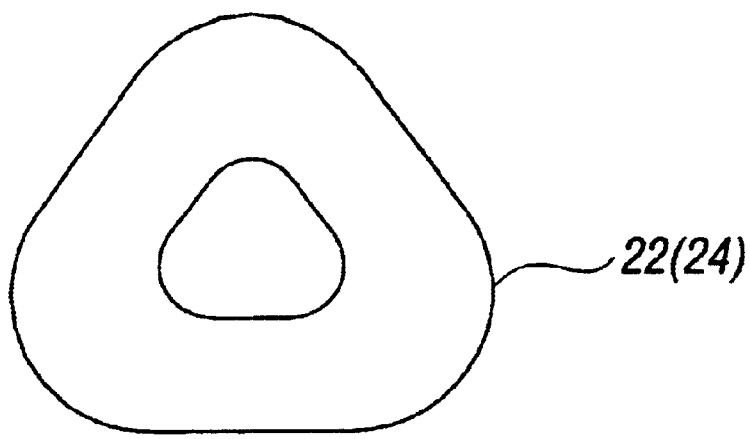
FIG. 2 is a sectional side view, to an enlarged scale, of one of the rods forming a slide track of the installation shown in FIG. 1.

Although the rods 22, 24 are shown as being of circular cross section in FIG. 1, in fact due to manufacturing techniques, they will be of the slightly lobed configuration shown in FIG. 2. In practice the rods 22, 24 will be of the order of 5 mm diameter, and so the clamping of the rods will be to fine tolerances.

The section 18 defines along its length two seats 26, 28 for the receipt of the rods 22, 24 respectively, and extending between the seats 26, 28 is a bridge 30. The bridge 30 has a central slot 32 for receiving the clamping bars or plugs 27.

At its base, the section 18 has a laterally projecting mounting plate portion 34 which as shown fits under the ledge 14 and a foot plate 36 which fits under the portion 12 of the plate 10 so that the rail is held in cantilever fashion. It can be seen that the rail 18 therefore can be readily demounted from and mounted on the plate 10 by tilting the rail clockwise in FIG. 1 for demounting from the plate 10 and by feeding and tilting in the opposite direction for mounting on the plate 10.

The rail 18 is designed so as to be fitted on site in the following manner.

At the site, the scaffolding is initially erected, and then the plates 10 are mounted thereon. Next, the sections 18 of the rails are mounted on the plates 10. At this time the clamping bars or plugs 27 are detached from the section 18.

The rods 22 and 24 are then placed on the seats 26, 28, and finally and simply and quickly, the bars or plugs 27 are pushed to snap fit to the section 18, simultaneously clamping the rods 22 and 24 in the position shown. In this position, the rods 22 and 24 in section project from the section 18 and clamping bars or plugs 27 by at least 2 mm in order that when hangers 38 for which the system is designed are placed on the rail as shown, they will contact only the rods 22 and 24 along which they can slide as described herein.

To enable the bars or plugs 27 to be snap fitted, they are provided with a lower tongue portion 40 with a conical head 42 which is pushed into the slot 32 and snaps thereinto to lock the bars or plugs to the section 18. When so locked the top edges 44 and 46 of the plugs or bars 27 engage and clamp against the rods 22 and 24, whereby they become wedged between the edges 44 and 46, and the seats 26 and 28 and are so held in exact position. The edges 44 and 46 engage the rods at a slightly higher position than where they are engaged by the seats 26 and 28, enhancing the clamping action.

The bars or plugs 27 have a central cut out 48 to enable drive dogs 50 to pass therethrough, in the case where the rail is to be used in a power driven system having for example a conventional drive chain 52 on which the drive dogs are carried.

The embodiment of the invention has the advantages of the invention mentioned herein.

Figure 1A:
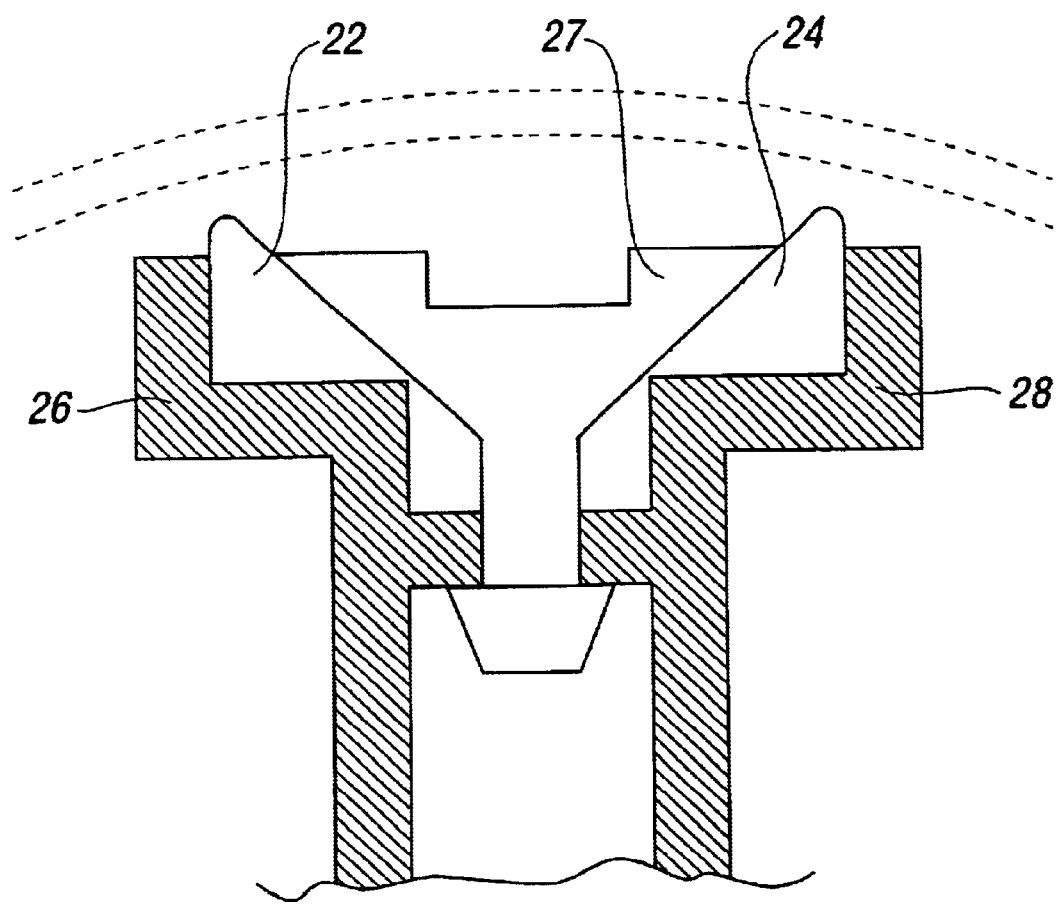
FIG. 1A is a sectional side view of part of a rail according to another embodiment of the invention, which is a modified form of the rail shown in FIG. 1.

FIG. 1A shows a similar arrangement to that described with reference to FIG. 1, the only difference being that the rods 22 and 24 are of the triangular shape shown, and the seats 26 and 28, and bars or plugs 27 are shaped accordingly. The triangular shape or indeed any shape which has a narrow top projecting portion and a broad base portion is particularly preferred as the base can be more easily clamped than a circular section, whilst still providing sufficient projection of the parts on which the hangers run, as will be more fully referred to hereinafter.

Many manifestations of the rail are possible and FIGS. 3 to 6 have been included to show how diverse the arrangements can be.

Figure 3:
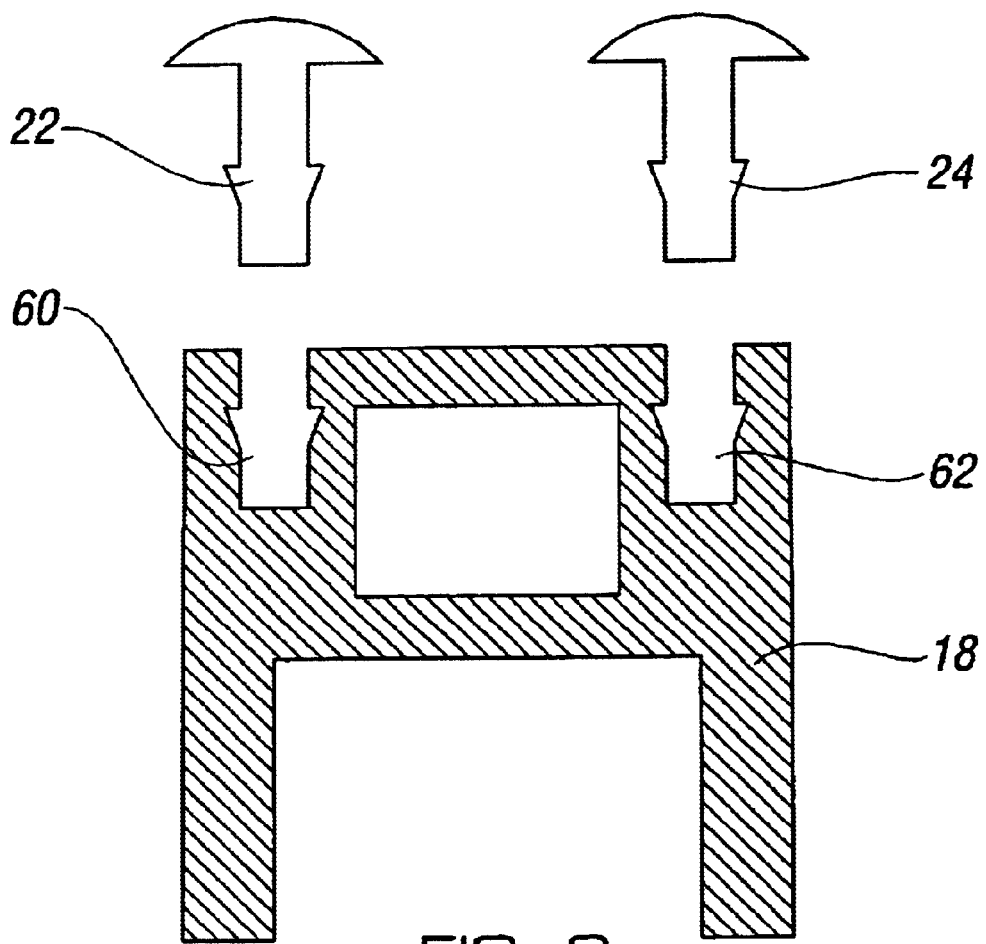
FIG. 3 is a sectional side elevation of a rail according to another embodiment of the invention.

In FIG. 3, the rail is made up of an A shaped section 18, and the top edges have slots 60, 62 of the shape shown to match the shape of the legs of the rods 22, 24 of the plastics material, the rods being of mushroom shape, the heads serving as the support surfaces for the hanger.

Figure 4:
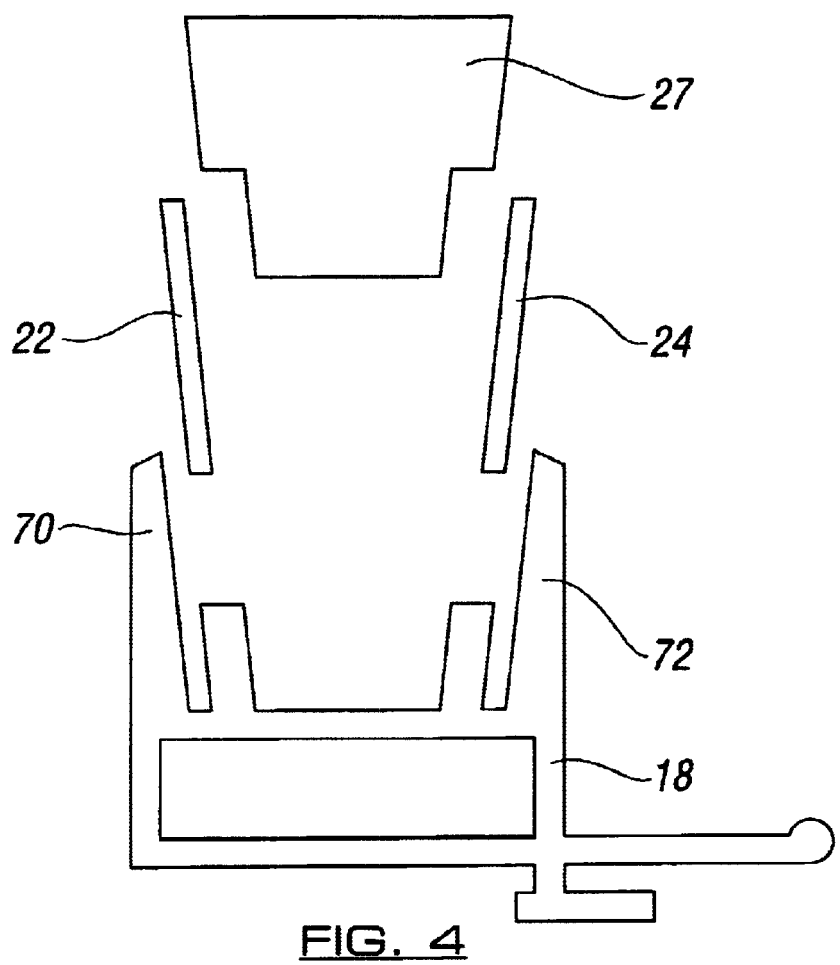
FIG. 4 is an exploded sectional view of a rail according to another embodiment of the invention.
Figure 5:
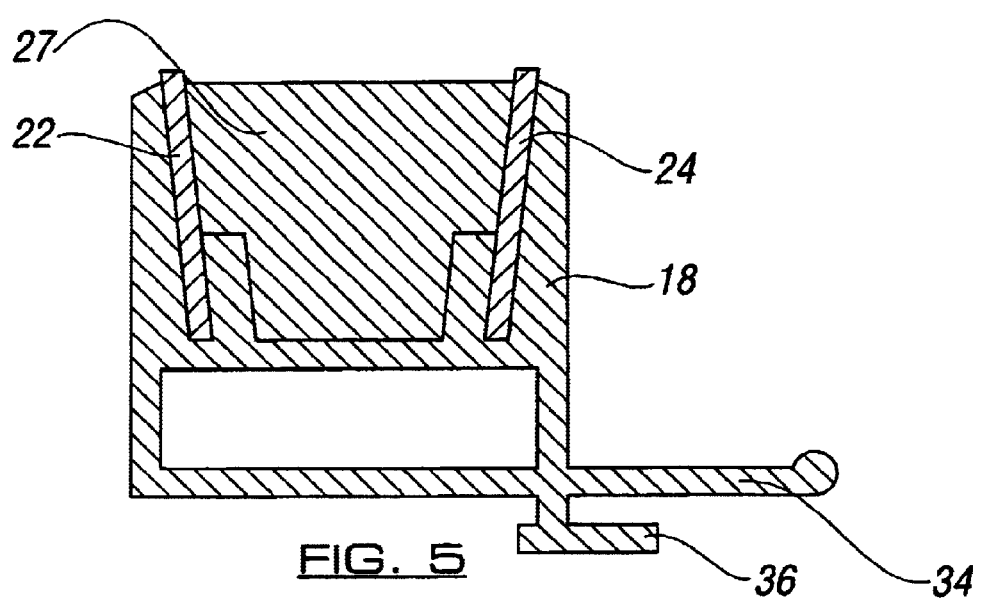
FIG. 5 is sectional side view of the rail of FIG. 4 in assembled condition.

In FIGS. 4 and 5, the rods 22 and 24 are flat in section, and in use lie on the inner faces of tapering side plates 70, 72 of the section 18.

The clamp bars or plugs 27 are of a shape in cross section to fit between the rods 22, 24 and clamp them onto the side plates 70, 72 when the bars or plugs 27 are fixed to the section 18, in this case by screws or other fixing means. In this case the bars or plugs 27 may be of aluminium as they are not snap fitted into section 18 as in the case of FIGS. 1 and 1A, and therefore they do not need to be resilient. FIG. 5 shows the assembled arrangement and the projecting of the top edges of the rods 22 and 24 will be noted.

Figure 6:
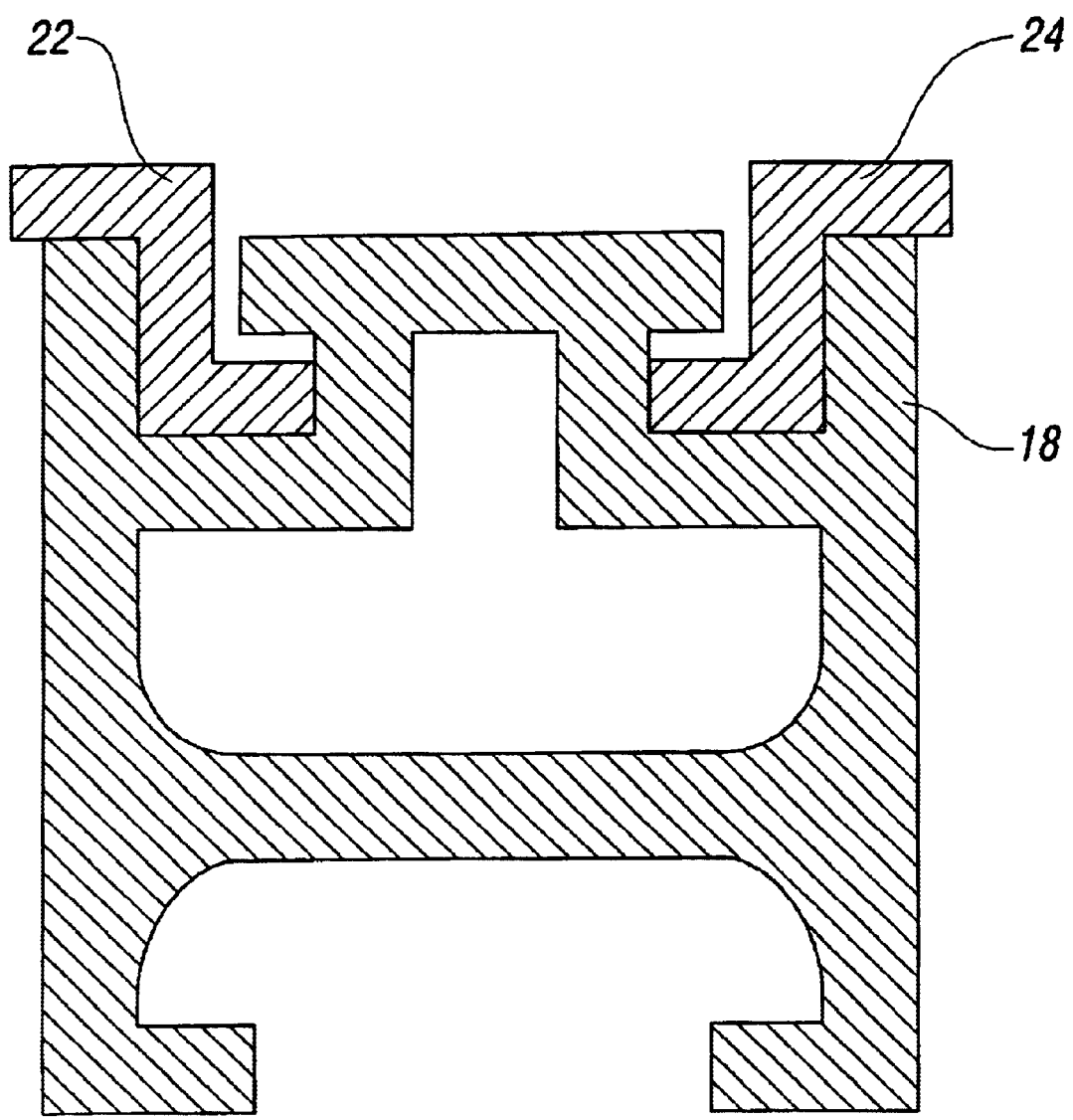
FIG. 6 is a sectional side view of a rail according to another embodiment of the invention.

In FIG. 6, which will be self explanatory, the rods 22, 24 are of Z cross section and fit into corresponding grooves in the top of section 18, which is again of A shape in cross section.

Where there is no clamping bar or plugs, the rods may be fed longitudinally into the grooves which are to receive them.

Figure 7:
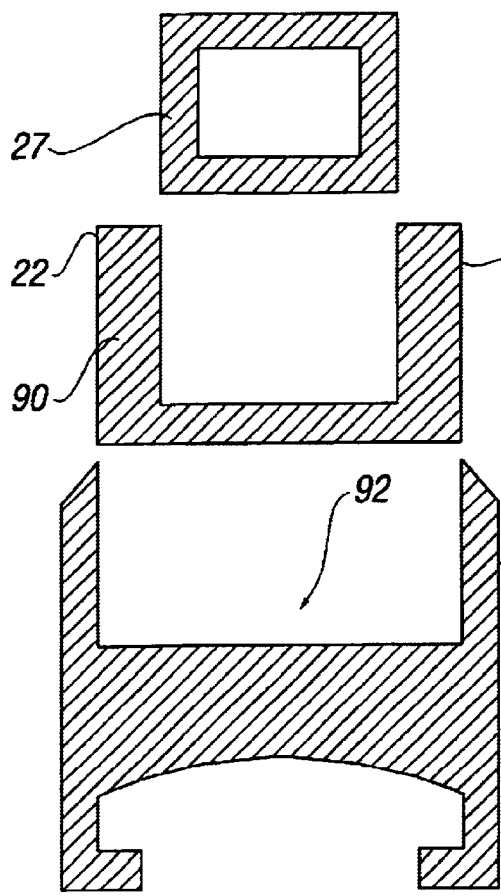
FIGS. 7 and 8 show in a manner similar to FIGS. 4 and 5, yet another embodiment of the invention, wherein the tracks are formed as parts of a single member.
Figure 8:
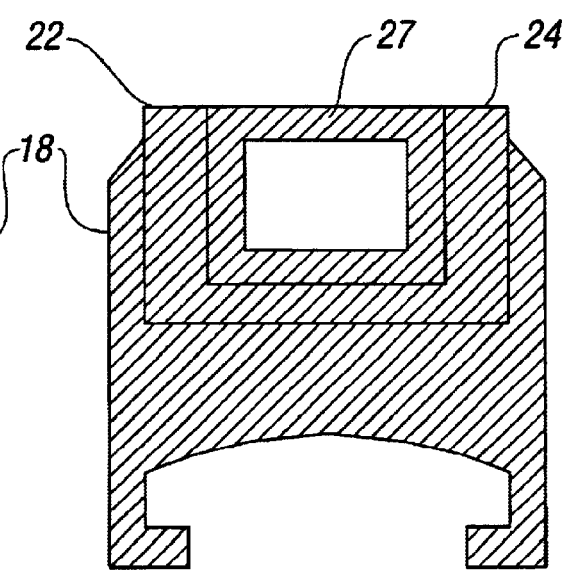

In the embodiment of FIGS. 7 and 8, the tracks 22 and 24 are formed in a single U sectioned bar 90, which in turn is fitted into a U shaped recess 92 of the section 18 (which is of H cross section) and the bar 90 is clamped by clamp bars 27 of hollow rectangular form, in that the bars 27 are fitted into the bar 90, and then are screwed or otherwise fixed to the section 18. The tracks 22 and 24, which project from the section 18 and bars 27 by at least 2 mm, are formed by the top corners of the bar 90. Embodiments of this type are not preferred as they use more plastics material in defining the tracks 22 and 24, and that plastics material is expensive. In the event of less expensive but still suitable plastics material becoming available in the future, then embodiments of this type would be more desirable.

It will be appreciated that the bar 90 and the corresponding rail section 18 and clamp bars 27 could be formed in other shapes.

FIGS. 9 to 13 show a particularly preferred embodiment of the invention. Referring to these FIGS., it will be noted from FIG. 9 that the arrangement is similar to the FIG. 1A embodiment but is simplified in that the hanger 10, which is again a one piece aluminium extrusion is a simple C shape, and the lower end of the C has a cross piece 10A which is received in the base of the body 18. The body is also a one piece aluminium extrusion, and is of rectangular cross section. On the top the body 18 has two half dove tail grooves 18A and 18B defining between them a dove tail rib 18C. In the rib 18C is a slot 100 so that between the base of the slot 100 and the respective half dove tail grooves 18A and 18B, are narrow neck portions 102 (see FIG. 10).

Figure 9:
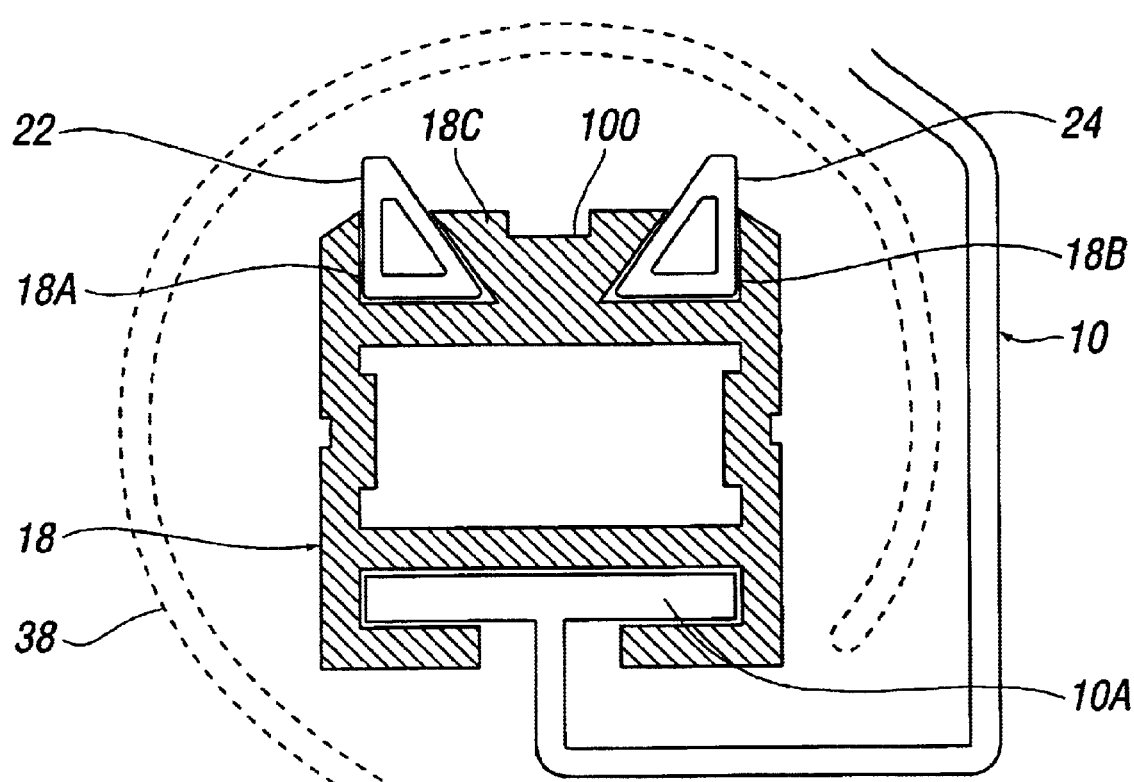
FIG. 9 is a view similar to FIG. 1 of yet a further, but specifically preferred and more simple, embodiment of the invention.
Figure 10:
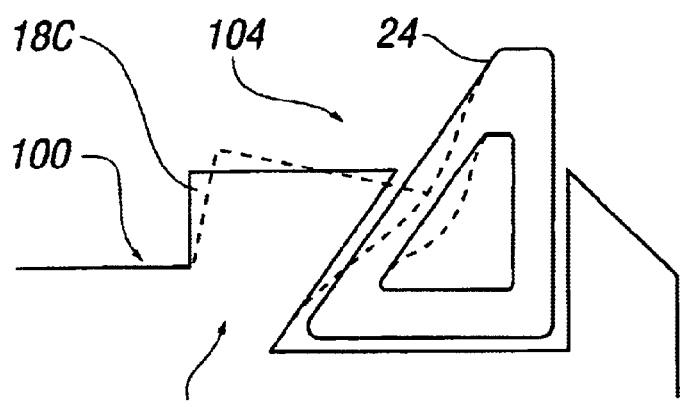
FIG. 10 is an enlarged detail view showing how the rods are held in the body in the FIG. 9 embodiment.

The rods 22 and 24 are of the hollow, right angled, triangular form shown in FIGS. 9 and 10 (but the may be rigid), and are received initially loosely in the grooves 18A and 18B. To fix the rods 22 and 24 in the grooves 18A and 18B, the rib 18C is deformed for example by crimping as indicated by arrow 104 in FIG. 10 so the rib bends at the neck portions 102 as shown in dotted lines in FIG. 10 to clamp the rods 22 and 24 in the grooves 18A and 18B.

Of particular advantage is the making of the rods 22 and 24 of the triangular form as the top of the triangular rod can be made to project further above the body 18 than for example circular rods and the triangular rods can be used in any embodiment. For the rods, other cross sectional shapes wherein there is a narrow projecting edge and a broad base can be used with equal effect.

FIG. 9 shows how the hanger 38 seats on the rods 22 and 24 during use.

Equally, the concept of clamping the rods 22 and 24 by deforming part of the body is an important feature and this can be used in any embodiment of the invention.

As the rail will be relatively long in the majority of cases, there will be joints in the rods. Also, there will be "switches" in the rods to enable the hangers to be directed along different paths.

Figure 11:
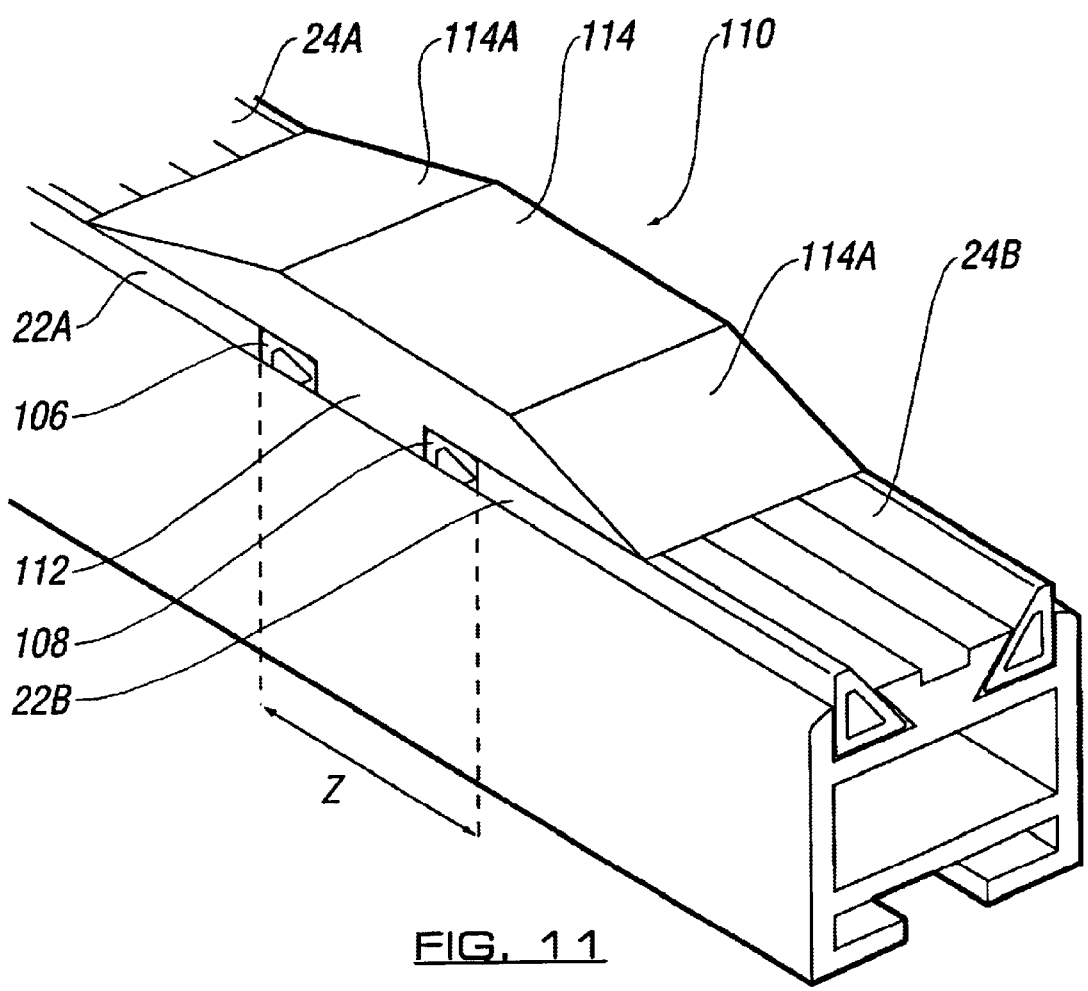
FIG. 11 is a perspective view of a section of the suspension rail showing the use of jumper rail sections at rod joints in the FIG. 9 embodiment.
Figure 12:
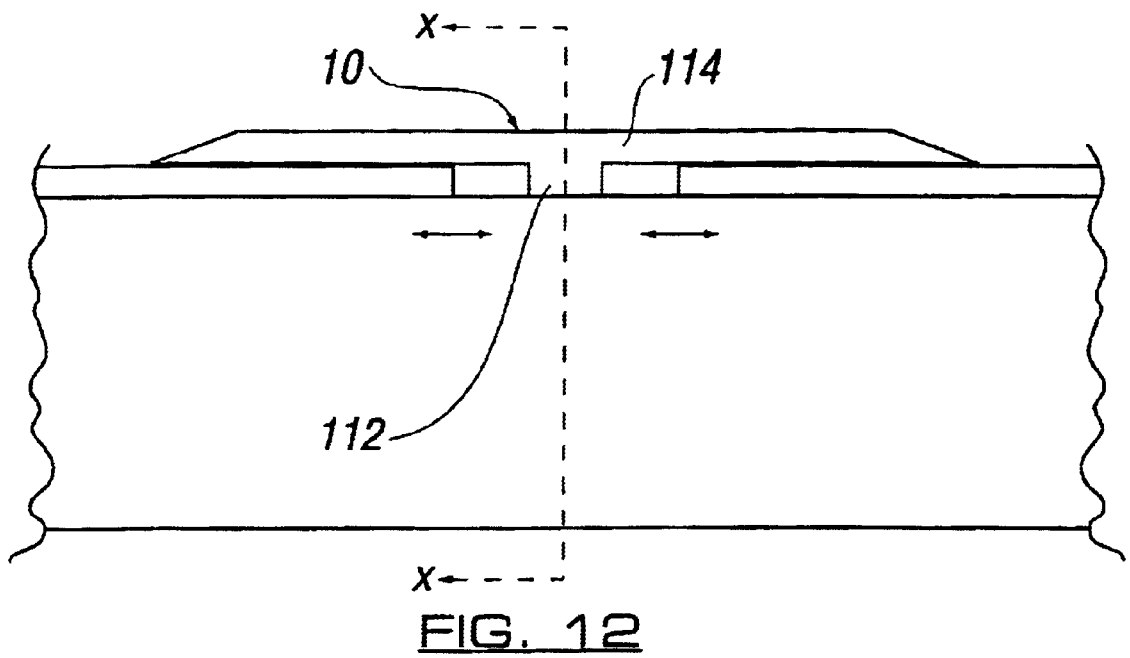
FIG. 12 is a side elevation of the arrangement of FIG. 9.
Figure 13:
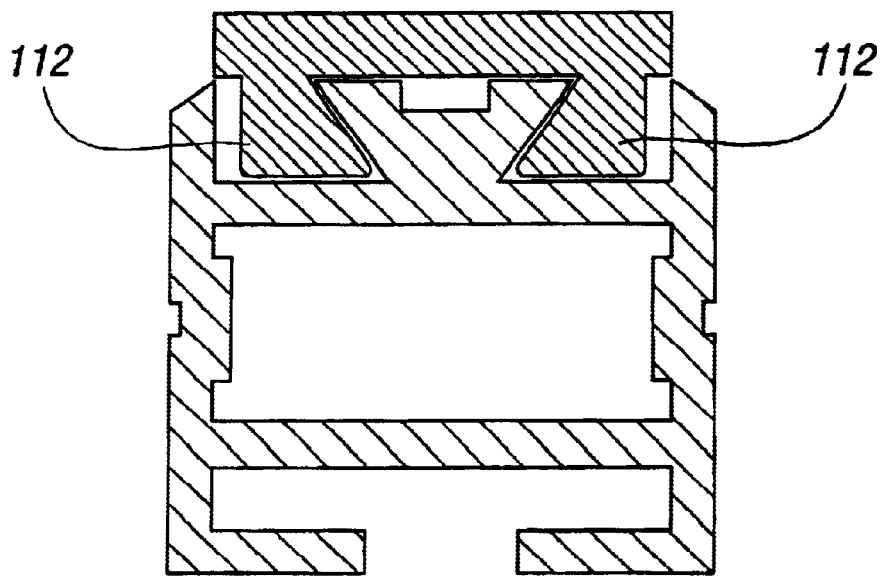
FIG. 13 is a sectional view taken on the line X—X of FIG. 12.

In any event, joints may desirable in order to take account of thermal expansion of the rods 22 and 24. FIGS. 11 to 13 show a preferred means of dealing with such joints. Although this means is described with reference to the embodiment of FIGS. 9 and 10, this means can be adapted for use with any embodiment of the invention. It is in itself an independent aspect of the invention.

Referring to FIGS. 11 to 13, at each joint, the rods 22 and 24 are in two sections 22A; 22B and 24A; 24B. These sections of each rod are aligned in that they are in the same grooves, but the respective adjacent ends 106 and 108 of the sections 22A and 22B (similarly for rod 24) are spaced at least by sufficient to allow for the maximum linear thermal expansion of the rods expected in use. In this case, the said spacing Z is sufficient to allow for the said thermal expansion and to accommodate a tongue 112 portion of a jumper rail section 110, in that said tongue 112 is received in the groove 18A to hold it in position (as shown in FIG. 13).

The jumper rail section 110, in the same plastic as the rods 22 and 24, has a thin top section 114 and ramp sections 114A of the configuration shown. The ramp sections 114A taper downwards and narrow in width so as to incline at their free extremities between and under the tops of the rods 22A; 24A and 22B; 24A so that at the joint hangers can slide over the section 110. The jumper rail section is of sufficient length to cover the ends of sections 22A and 22B at all times and has the sloped portions 114A at the ends to ensure that hangers can be slid smoothly over the jumper section 110 from either direction. The jumper section is symmetrical and so has two tongues 112 engaging respectively in the grooves 18A and 18B. The operation is self-explanatory in that as each hanger 38 arrives at the joint, it will slide up the sloped section of the jumper section 110, over the section 114 and back onto the rods 22 and 24 at the other side of the joint.

Figures 14, 15:
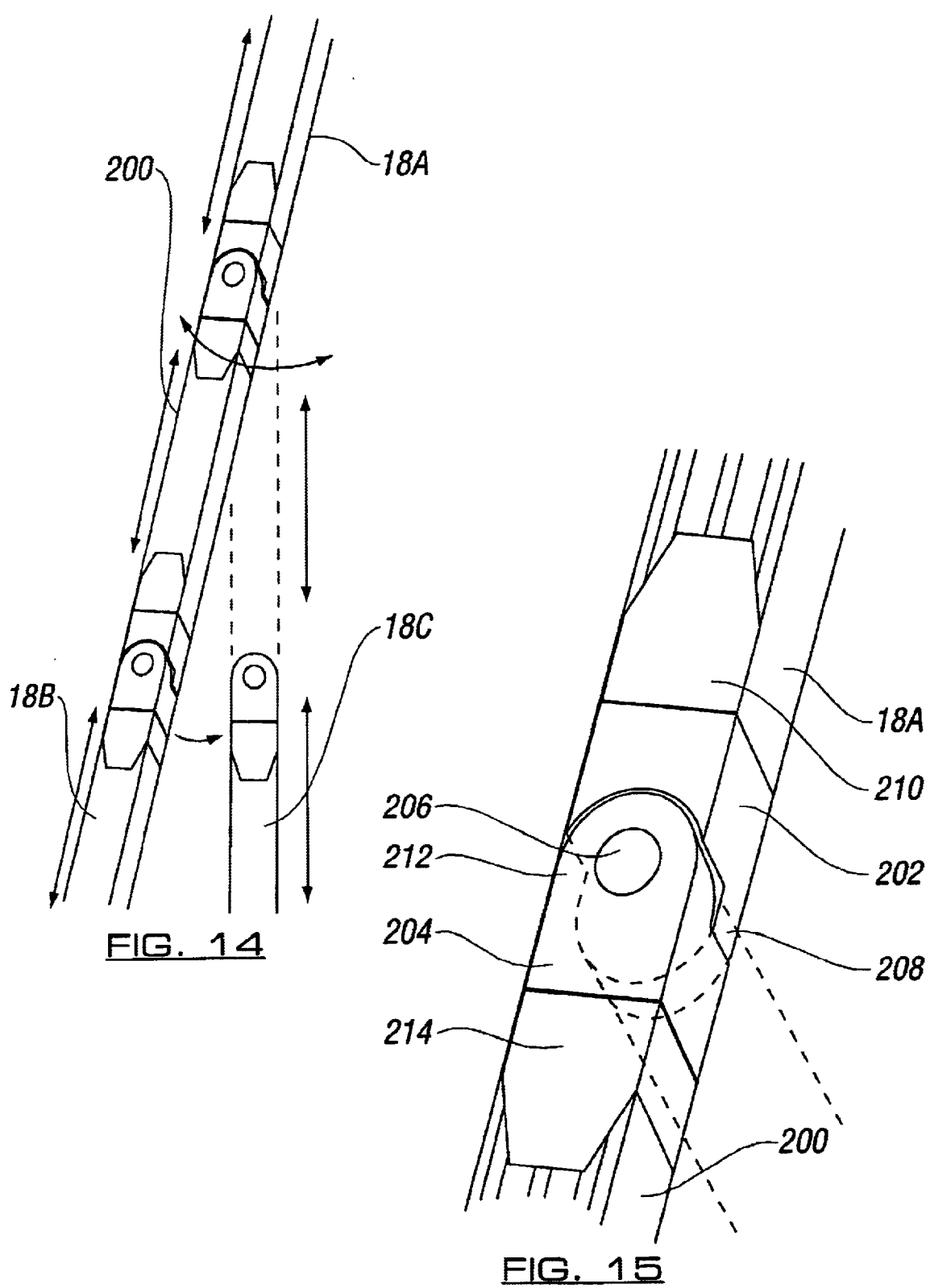
FIG. 14 is a perspective view of a switch arrangement.
FIG. 15 is a perspective view showing how the various rail sections of the switch of FIG. 14 are connected by specially adapted connector blocks, according to the invention.

FIGS. 14 and 15 show the arrangement adopted at a switch connection. In FIG. 14, the switch is defined by a first main length of rail 18A, a length of connector rail 200, and second and third main lengths of rail 18B, 18C. All of these rail sections are of the same cross section and construction as the rail 18 illustrated in and described with reference to FIG. 9. The main rail lengths 18A, 18B and 18C are fixed in position, and 18B and 18C lie at an angle to each other as shown, and the idea of the switch is that the connector rail, which is connected to the main length 18A can be pivoted, in this case manually, so as to align with and be connected to either rail 18B or 18C, depending upon the direction in which the garments are to be sent, or the direction from which they arrive.

FIG. 15 shows in more detail how the connector rail 200 is connected to the first rail 18A. The connection is made by two complimentary blocks 202 and 204, each being of plastics material. The blocks 202 and 204 are pivotally interconnected at a pivot axis 206 defined by a plastic pin (not shown) recessed in the blocks so as not to obstruct the passage of the hangers over the blocks. The first block 202 has a lower step 208 at its front end and at its rear end it has plugs (not shown) by which the block is interference push fitted into the channels/grooves in the rail 18A. At the top, the block 202 has a jumper section 210, similar to one half of the jumper section 110 shown in FIG. 11, which is constructed similar to, and functions in the same manner as, the jumper section 110. The block 202 is of the same outer shape as the rail 18A, so that hangers travelling towards and over the block will ride up the jumper section 210 and over the block 202 and onto the block 204. The ends 106, 108 of the rods (see FIG. 11) are spaced from the blocks sufficiently to allow for the thermal expansion referred to herein.

Block 204 is of similar but complimentary construction, in that it has an overhang 212 overlying the step 208, and the overhang 212 and the step 208 are curved at their extremities to fit neatly to corresponding curved walls of the other blocks. As the blocks are pivoted to different positions therefore, no gaps in which the hangers could snag are created. The block 204 fits into the connector rail 200 in the same manner as block 202 fits in rail 18A, and again block 204 is provided with a jumper section 214, similar in construction and use as jumper section 210.

To enable the hangers to pass smoothly over the blocks 202 and 204, the top edges of the blocks may be chamfered or rounded.

In FIG. 14, the connector rail 200 is shown as being connected to rail 18B. At this connection, similar complimentary connector blocks are used, the only difference being that the connection at the pivot axis is such that the end of the connector rail 200 adjacent rail 18B can be raised clear of the connector block in rail 18B, and the connector rail can then be swung to the dotted line position in alignment with rail 18C, and the connector block on rail 200 can be connected to the connector block on rail 18C. Regardless of whether the connector rail 200 is connected to rail 18B or 18C, the hangers can still pass over the connection in the same fashion as they pass over the connection shown in FIG. 15.

In all embodiments of the invention, the two tracks 22, 24 of low friction, low wear plastics material serve as the contact surfaces for the hangers, so as to provide low friction contact, which does not require lubrication and is much more efficient than the existing steel rails. Preferably aluminium is used for the components of the rail as far as possible. The rails of some embodiments are designed so that assembly can take place on site, as often it is necessary on site to modify the fitting due to unexpected measurement problems.

Specific advantage results however in using specially shaped plastic tracks of the type having a narrow top portion and a wide base portion, and these can be more easily gripped as explained herein.

The invention furthermore provides added advantage in that jumper sections which overlie the tracks and extend from a position between and/or below the tracks lead the hangers up a ramp to pass smoothly over a joint and/or switch connection.

Rails constructed according to the invention can be used as direct replacements for conventional steel rails and in all instances where the conventional steel rails are used.

What is claimed is:

1. A suspension rail comprising a rail body having slide track means extending lengthwise of the rail, said slide track means being adapted to slidably support hangers thereon, characterised in that the slide track means defines two parallel, spaced tracks of low friction plastics held in or by the rail body, so that a hanger suspended on the rail contacts the rail only at the two tracks.

2. A suspension rail according to claim 1, wherein the tracks are of the plastic material sold by Du Pont under the name DERLIN (registered trade mark).

3. A suspension rail according to claim 1 or 2, wherein the two tracks are separate, discrete rods.

4. A suspension rail according to claim 3, wherein the rods are of, or approximating, a shape having a narrow top and a wide base, such as a triangular shape, in cross section.

5. A suspension rail according to claim 4, wherein the rods are hollow.

6. A suspension rail according to claim 4, wherein the rods are of right angled triangular shape in cross section.

7. A suspension rail according to claim 3, wherein the rods are of the order of ⅝ mm in diameter or maximum dimension.

8. A suspension rail according to claim 4, wherein the rods bases are initially held in grooves in the body in a somewhat loose fashion and then the rods are anchored in the grooves by deforming the material forming the sides of the grooves onto the rods.

9. A suspension rail according to claim 8, wherein the body is configured to enable said deforming to be done.

10. A suspension rail according to claim 9, wherein the body is a one-piece extrusion.

11. A suspension rail according to claim 8, wherein the rail has at least one expansion joint, enabling the plastic rods to expand with temperature increase, and at such joint, the aligned ends of rod sections in the same groove are spaced by an amount at least sufficient to allow expansion, and there is a jumper rail section which overlies the spaced aligned rod ends, providing a ramp over which the hangers travel as they are moved along the rail and over the joint.

12. A suspension rail according to claim 3, wherein the rail has a switch section at which lengths of rail are connected together by connector blocks connected to the respective length sections, and there is a jumper rail section on each block which overlies the rod ends of the adjacent rail, providing a ramp over which the hangers travel as they are moved along the rail and over the switch section.

13. A suspension rail according to claim 11, wherein the jumper rail section is for a joint, and has tongues which are engaged in the grooves between the aligned ends of the rod sections, which are spaced sufficient to accommodate the expansion and the tongues.

14. A suspension rail system according to claim 12, wherein the jumper rail section is for a joint, and has tongues which are engaged in the grooves between the aligned ends of the rod sections, which are spaced sufficient to accommodate the expansion and the tongues.

15. A suspension rail system according to claim 11, wherein each jumper section has at least one ramp portion which extends from a position below and between the rods to a position above the rods.

16. A suspension rail according to claim 12, wherein each jumper section has at least one ramp portion which extends from a position below and between the rods to a position above the rods.

* * * * *